(12) United States Patent
Takeno et al.

(10) Patent No.: US 12,291,847 B2
(45) Date of Patent: May 6, 2025

(54) CONTROL DEVICE AND CONTROL METHOD FOR DETERMINING REQUIRED BRAKING FORCE OF WORK VEHICLE

(71) Applicant: KOMATSU LTD., Tokyo (JP)

(72) Inventors: Akira Takeno, Tokyo (JP); Ryota Enomoto, Tokyo (JP); Koshiro Kodo, Tokyo (JP); Naoki Uchida, Tokyo (JP); Shinobu Shimanaka, Tokyo (JP); Shogo Miyazaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 617 days.

(21) Appl. No.: 17/419,544

(22) PCT Filed: Mar. 31, 2020

(86) PCT No.: PCT/JP2020/014823
§ 371 (c)(1),
(2) Date: Jun. 29, 2021

(87) PCT Pub. No.: WO2020/204028
PCT Pub. Date: Oct. 8, 2020

(65) Prior Publication Data
US 2022/0074169 A1 Mar. 10, 2022

(30) Foreign Application Priority Data

Apr. 4, 2019 (JP) ................................ 2019-072268

(51) Int. Cl.
*E02F 9/20* (2006.01)
*B60W 10/06* (2006.01)
(Continued)

(52) U.S. Cl.
CPC ........... *E02F 9/2083* (2013.01); *B60W 10/06* (2013.01); *B60W 10/10* (2013.01); *B60W 10/18* (2013.01);
(Continued)

(58) Field of Classification Search
CPC .... F01L 13/06–065; F02D 9/06; F02D 13/04; F02D 41/12–126; E02F 9/2083;
(Continued)

(56) References Cited

U.S. PATENT DOCUMENTS

2006/0166786 A1 7/2006 Baasch et al.
2015/0315767 A1 11/2015 Miyamoto et al.
(Continued)

FOREIGN PATENT DOCUMENTS

EP 2 098 759 A1 9/2009
EP 2 910 441 A1 8/2015
(Continued)

OTHER PUBLICATIONS

The International Search Report for the corresponding international application No. PCT/JP2020/014823, issued on Jun. 23, 2020.

*Primary Examiner* — Rami Khatib
*Assistant Examiner* — Paul Allen
(74) *Attorney, Agent, or Firm* — Global IP Counselors, LLP

(57) ABSTRACT

A control device of a work vehicle includes a braking force function determination unit and a required braking force function determination unit. The braking force function determination unit determines at least one of an offset and an inclination for a required braking force in a braking force function which indicates a relationship between a rotational speed of an output shaft of a transmission and the required braking force and in which the required braking force monotonically increases with respect to the rotational speed such that the smaller a stage number of a selected speed stage which is input into a traction force instruction device, the larger an absolute value of at least one of the offset and the inclination. The required braking force function determination unit determines the required braking force based (Continued)

on the rotational speed of the output shaft of the transmission and the braking force function.

8 Claims, 9 Drawing Sheets

(51) Int. Cl.
   *B60W 10/10* (2012.01)
   *B60W 10/18* (2012.01)
   *B60W 30/18* (2012.01)
(52) U.S. Cl.
   CPC ... *B60W 30/18136* (2013.01); *B60W 2300/17* (2013.01); *B60W 2510/1005* (2013.01); *B60W 2510/104* (2013.01); *B60W 2540/10* (2013.01); *B60W 2540/16* (2013.01); *B60W 2710/0666* (2013.01); *E02F 9/2079* (2013.01)
(58) Field of Classification Search
   CPC . E02F 9/2253; E02F 9/00; B60W 10/18–198; B60W 30/18136; B60W 2510/104; B60W 2710/0666; B60T 8/00
   USPC .............................................. 701/50, 70–98
   See application file for complete search history.

(56) References Cited

U.S. PATENT DOCUMENTS

| | | | | |
|---|---|---|---|---|
| 2015/0322645 A1* | 11/2015 | Miyamoto | ............ | B60K 6/365 180/65.245 |
| 2015/0361636 A1* | 12/2015 | Yoshizawa | ............ | E02F 9/2075 903/902 |
| 2016/0016562 A1* | 1/2016 | McKnight | ............. | B60T 8/1701 701/70 |
| 2016/0017570 A1* | 1/2016 | Miyamoto | ............ | B60W 10/10 180/53.4 |
| 2016/0121900 A1* | 5/2016 | Yoshizawa | .............. | E02F 9/202 701/50 |
| 2016/0130786 A1* | 5/2016 | Miyamoto | ............ | B60W 10/02 701/50 |
| 2016/0145836 A1* | 5/2016 | Yamada | ................. | F02D 29/00 701/50 |
| 2016/0237651 A1* | 8/2016 | Miyamoto | .......... | B60W 30/182 |

FOREIGN PATENT DOCUMENTS

| | | |
|---|---|---|
| JP | 5-204452 A | 8/1993 |
| JP | 6-48226 A | 2/1994 |
| JP | 2005-535508 A | 11/2005 |
| JP | 6182990 B2 | 8/2017 |
| WO | 2014/208614 A1 | 12/2014 |

* cited by examiner

CONTROL DEVICE AND CONTROL METHOD FOR DETERMINING REQUIRED BRAKING FORCE OF WORK VEHICLE

CROSS REFERENCE TO RELATED APPLICATION(S)

This application is a U.S. National stage application of International Application No. PCT/JP2020/014823, filed on Mar. 31, 2020. This U.S. National stage application claims priority under 35 U.S.C. § 119(a) to Japanese Patent Application No. 2019-072268, filed in Japan on Apr. 4, 2019, the entire contents of which are hereby incorporated herein by reference.

BACKGROUND

Field of the Invention

The present invention relates to a work vehicle, a control device of a work vehicle, and a control method of a work vehicle.

Background Information

Work vehicles such as a wheel loader equipped with a continuously variable transmission are known. Examples of a continuously variable transmission include a hydraulic static transmission (HST) and a hydraulic mechanical transmission (HMT). PCT International Publication No. WO 2014/208614 discloses a technology which realizes a traction force in accordance with an intention of an operator by modifying a traction force function, which indicates a relationship between a rotational speed of an output shaft of the transmission and a required traction force, based on an input to an accelerator of the work vehicle equipped with the continuously variable transmission.

SUMMARY

According to the technology disclosed in PCT International Publication No. WO 2014/208614, a traction force for accelerating a work vehicle can be appropriately controlled based on an input to an accelerator. However, since characteristics of a braking force for decelerating the work vehicle do not change, an operator is required to perform a fine accelerator operation and a braking operation for obtaining an arbitrary braking force.

An object of the present invention is to provide a work vehicle, a control device of a work vehicle, and a control method of a work vehicle in which an operator can easily obtain an arbitrary braking force.

Solution to Problem

According to an aspect of the present invention, a control device of a work vehicle is provided, the control device including a drive source, a traveling device driven by a driving force of the drive source, a power transmission device which has an input shaft connected to the drive source and an output shaft connected to the traveling device and transmits the driving force input to the input shaft to the output shaft, and a traction force instruction device configured to receive a traction force instruction of instructing a strength of a traction force of the traveling device, and the control device including a braking force function determination unit which determines at least one of an offset and an inclination for a required braking force in a braking force function, which indicates a relationship between a rotational speed of the output shaft and the required braking force and in which the required braking force monotonically increases with respect to the rotational speed, such that the stronger the traction force indicated by the traction force instruction from the traction force instruction device, the larger an absolute value of at least one of the offset and the inclination, and a required braking force function determination unit which determines the required braking force based on the rotational speed of the output shaft and the braking force function.

According to at least one of the above aspects, the operator can easily obtain an arbitrary braking force.

DETAILED DESCRIPTION OF EMBODIMENT(S)

First Embodiment

Figure 1:
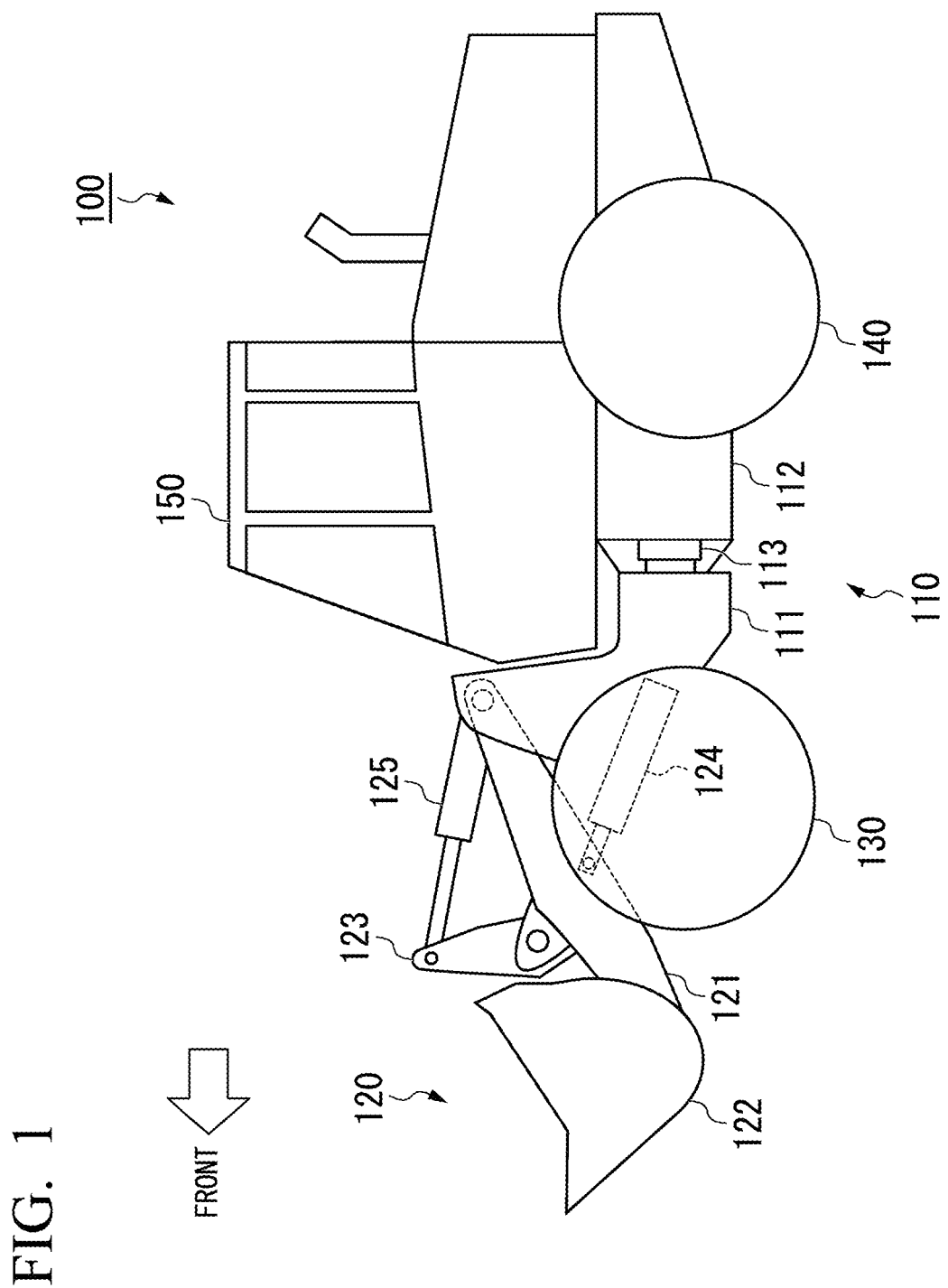
FIG. 1 is a side view of a work vehicle according to a first embodiment.

Hereinafter, an embodiment will be described in detail with reference to the drawings.
FIG. 1 is a side view of a work vehicle according to a first embodiment.
The work vehicle 100 according to the first embodiment is a wheel loader. The work vehicle 100 includes a vehicle body 110, work equipment 120, a front wheel portion 130, a rear wheel portion 140, and a cab 150.
The vehicle body 110 includes a front vehicle body 111, a rear vehicle body 112, and a steering cylinder 113. The front vehicle body 111 and the rear vehicle body 112 are rotatably attached around a steering axis extending in an upward-downward direction of the vehicle body 110. The front wheel portion 130 is provided below the front vehicle body 111, and the rear wheel portion 140 is provided below the rear vehicle body 112.
The steering cylinder 113 is a hydraulic cylinder. A base end portion of the steering cylinder 113 is attached to the rear vehicle body 112, and a tip end portion of the steering cylinder 113 is attached to the front vehicle body 111. The steering cylinder 113 expands and contracts with a hydraulic oil to regulate an angle between the front vehicle body 111 and the rear vehicle body 112. That is, the steering angle of the front wheel portion 130 is regulated by expansion and contraction of the steering cylinder 113.

The work equipment 120 is used for excavating and transporting a work object such as earth. The work equipment 120 is provided at a front portion of the vehicle body 110. The work equipment 120 includes a boom 121, a bucket 122, a bell crank 123, a lift cylinder 124, and a bucket cylinder 125.

A base end portion of the boom 121 is attached to a front portion of the front vehicle body 111 via a pin.

The bucket 122 includes a blade for excavating a work object and a container for transporting the excavated work object. A base end portion of the bucket 122 is attached to a tip end portion of the boom 121 via a pin.

The bell crank 123 transmits the power of the bucket cylinder 125 to the bucket 122. A first end of the bell crank 123 is attached to a bottom portion of the bucket 122 via a link mechanism. A second end of the bell crank 123 is attached to a tip end portion of the bucket cylinder 125 via a pin.

The lift cylinder 124 is a hydraulic cylinder. A base end portion of the lift cylinder 124 is attached to the front portion of the front vehicle body 111. A tip end portion of the lift cylinder 124 is attached to the boom 121. As the lift cylinder 124 expands and contracts with the hydraulic oil, the boom 121 is driven in a raising direction or in a lowering direction.

The bucket cylinder 125 is a hydraulic cylinder. A base end portion of the bucket cylinder 125 is attached to the front portion of the front vehicle body 111. The tip end portion of the bucket cylinder 125 is attached to the bucket 122 via the bell crank 123. As the bucket cylinder 125 expands and contracts with the hydraulic oil, the bucket 122 is driven in a tilt direction or in a dump direction.

The cab 150 is a space for an operator to board and operate the work vehicle 100. The cab 150 is provided above the rear vehicle body 112.

Figure 2:
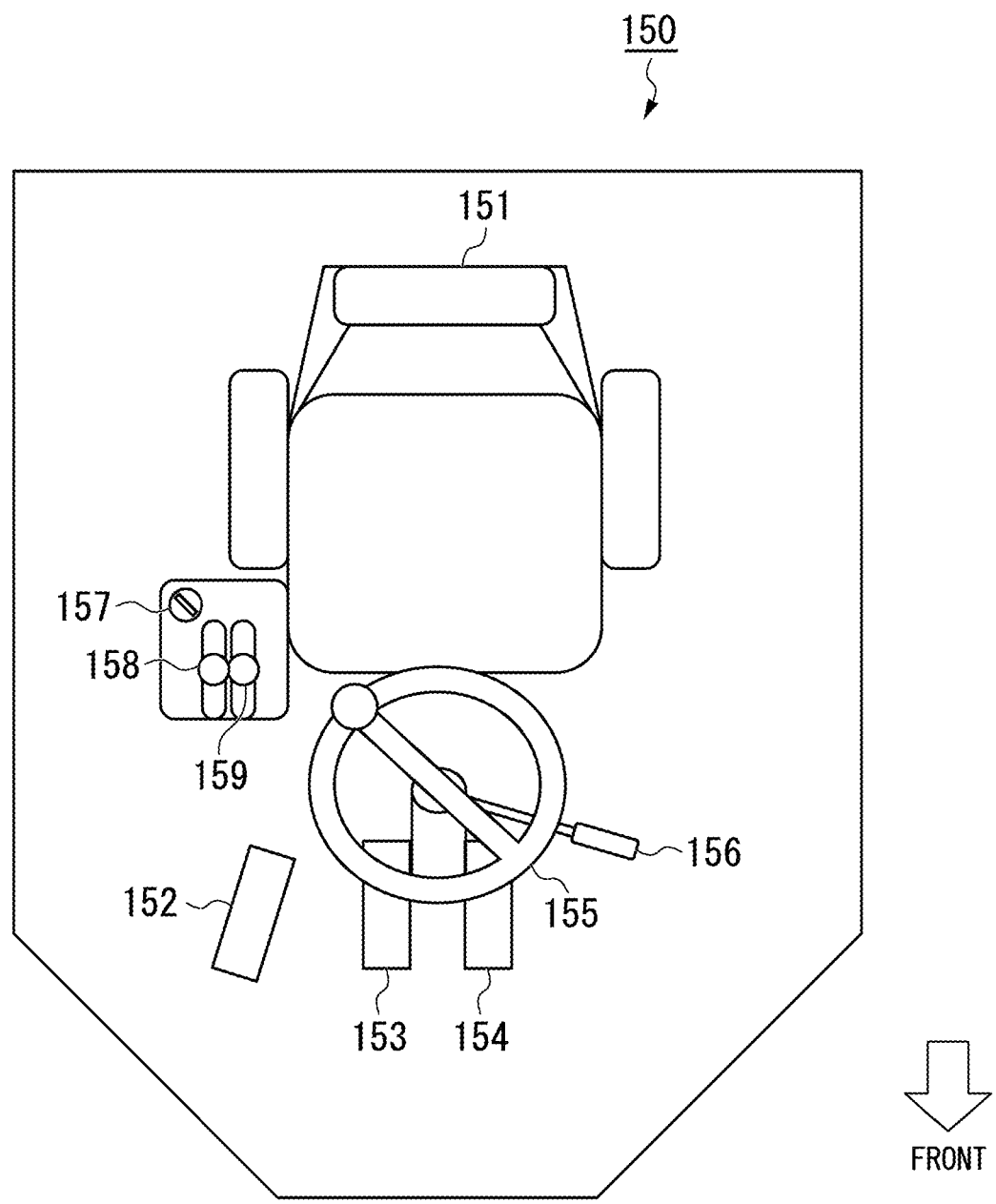
FIG. 2 is a top view showing an internal configuration of a cab according to the first embodiment.

FIG. 2 is a top view showing an internal configuration of the cab according to the first embodiment. Inside the cab 150, a seat 151, an accelerator pedal 152, a brake pedal 153, a steering wheel 155, a forward and rearward movement changeover switch 156, a shift switch 157, a boom lever 158, and a bucket lever 159 are provided.

The accelerator pedal 152 is operated to instruct the strength of a traction force which is generated in the work vehicle 100. The larger an operation amount of the accelerator pedal 152, the higher a target driving force is set to be. The operation amount of the accelerator pedal 152 has a value of 0% or more and 100% or less. The accelerator pedal 152 is an example of a driving force operating device.

The brake pedal 153 is operated to set a braking force in traveling which is generated in the work vehicle 100. The larger an operation amount of the brake pedal 153, the stronger the braking force is set to be. The operation amount of the brake pedal 153 has a value of 0% or more and 100% or less.

The steering wheel 155 is operated to set the steering angle of the work vehicle 100.

The forward and rearward movement changeover switch 156 is operated to set a traveling direction of the work vehicle 100. The traveling direction of the work vehicle is any one of forward (F), rearward (R), and neutral (N).

The shift switch 157 is operated to instruct the strength of a driving force (traction force) in traveling which is generated in the work vehicle 100. By the operation of the shift switch 157, one speed stage is selected from a plurality of speed stages (for example, eight speed stages) that can be arbitrarily set. The smaller a stage number of the speed stage, the lower a ratio of the traction force to the traveling speed, and the larger the stage number of the speed stage, the higher the ratio of the traction force to the traveling speed. That is, the smaller the stage number of the speed stage, the stronger the traction force required. The shift switch 157 is an example of a traction force instruction device. The braking force is also expressed as a negative traction force, and the strength of the traction force indicates the magnitude of an absolute value of the traction force. That is, the smaller the stage number of the speed stage, the stronger the braking force exhibited.

The boom lever 158 is operated to set the speed of a raising operation or a lowering operation of the boom 121. The lowering operation is performed when the boom lever 158 is tilted forward and the raising operation is performed when the boom lever 158 is tilted rearward.

The bucket lever 159 is operated to set the speed of a dump operation or a tilt operation of the bucket 122. The dump operation is performed when the bucket lever 159 is tilted forward and the tilt operation is performed when the bucket lever 159 is tilted rearward.

The boom lever 158 and the bucket lever 159 are examples of a work equipment operating member.

(Power System)

Figure 3:
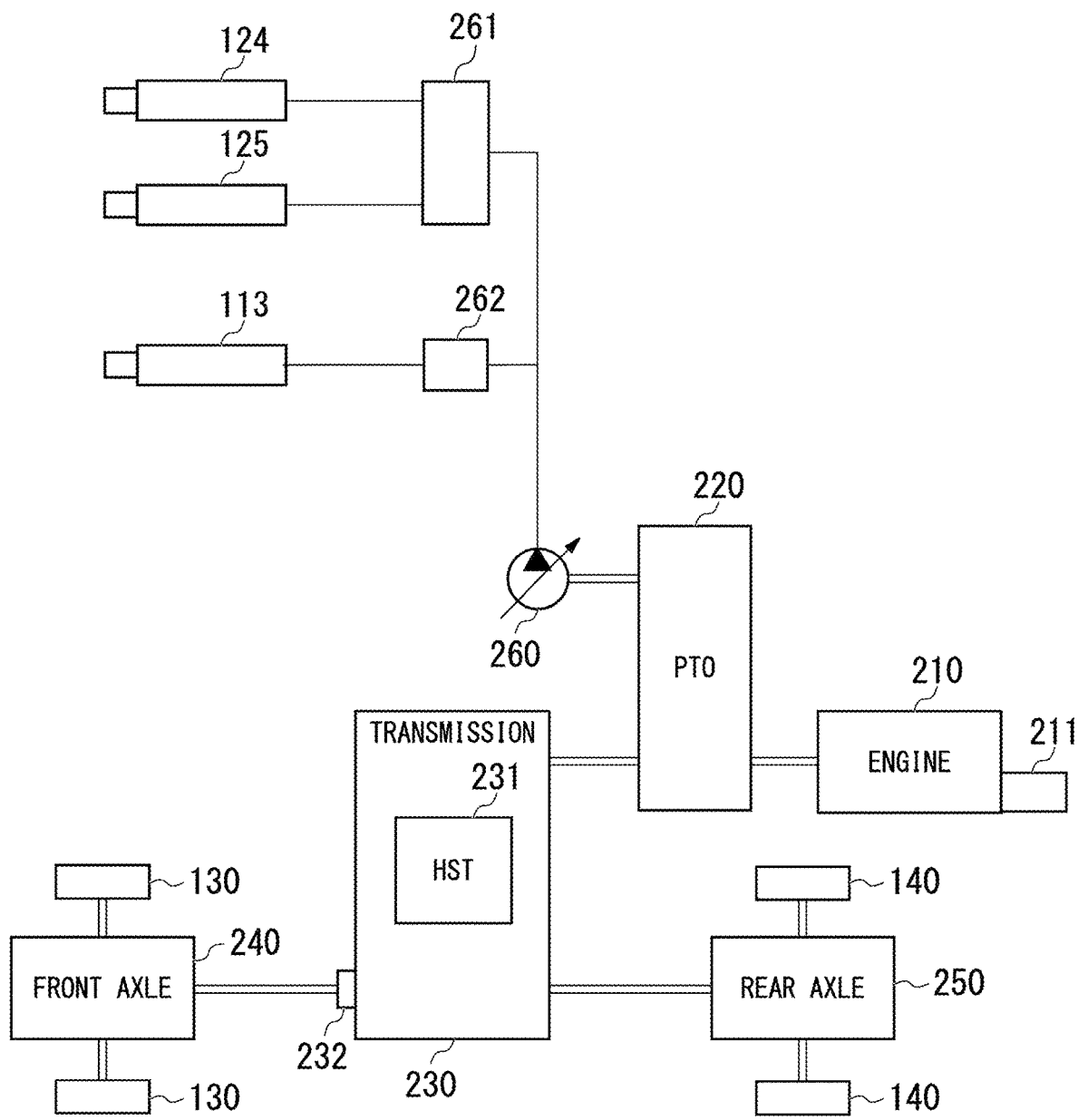
FIG. 3 is a schematic view showing a power system of the work vehicle according to the first embodiment.

FIG. 3 is a schematic view showing a power system of the work vehicle according to the first embodiment.

The work vehicle 100 includes an engine 210, a power take-off (PTO) 220, a transmission 230, a front axle 240, a rear axle 250, and a variable capacity pump 260.

The engine 210 is, for example, a diesel engine. The engine 210 is provided with a fuel injection device 211. The fuel injection device 211 controls a driving force of the engine 210 by adjusting the amount of fuel which is injected into a cylinder of the engine 210.

The PTO 220 transmits a part of the driving force of the engine 210 to the variable capacity pump 260. That is, the PTO 220 distributes the driving force of the engine 210 to the transmission 230 and the variable capacity pump 260.

The transmission 230 is a continuously variable transmission provided with a hydraulic static transmission (HST) 231. The transmission 230 may perform shifting control by only the HST 231 or may be a hydraulic mechanical transmission (HMT) that performs shifting control by a combination of the HST 231 and a planetary gear mechanism. Further, the transmission 230 may have an electric hybrid configuration in which a hydraulic motor of the HST or the HMT is replaced with an electric motor. Further, in a case in which the work vehicle 100 is an electric vehicle that does not have an engine and directly obtains a driving force of an electric motor from a power source such as a storage battery, the transmission 230 may control the rotational speed of the electric motor. The transmission 230 shifts the driving force which is input to an input shaft thereof and outputs the shifted driving force from an output shaft thereof. The input shaft of the transmission 230 is connected to the PTO 220, and the output shaft of the transmission 230 is connected to the front axle 240 and the rear axle 250. That is, the transmission 230 transmits the driving force of the engine 210 which is distributed by the PTO 220 to the front axle 240 and the rear axle 250. A rotational speed meter 232 is provided on the output shaft of the transmission 230.

The front axle 240 transmits the driving force output by the transmission 230 to the front wheel portion 130. As a result, the front wheel portion 130 is rotated.

The rear axle 250 transmits the driving force output by the transmission 230 to the rear wheel portion 140. As a result, the rear wheel portion 140 is rotated.

The variable capacity pump 260 is driven by the driving force from the engine 210. The discharge capacity of the variable capacity pump 260 is changed, for example, by control of a tilt angle of a swash plate provided in the variable capacity pump 260. The hydraulic oil discharged from the variable capacity pump 260 is supplied to the lift cylinder 124 and the bucket cylinder 125 via a control valve 261 and is supplied to the steering cylinder 113 via a steering valve 262.

The control valve 261 controls the flow rate of the hydraulic oil discharged from the variable capacity pump 260 and distributes the hydraulic oil to the lift cylinder 124 and the bucket cylinder 125. The steering valve 262 controls the flow rate of the hydraulic oil which is supplied to the steering cylinder 113.

(Control Device)

The work vehicle 100 includes a control device 300 for controlling the work vehicle 100.

The control device 300 outputs a control signal to the fuel injection device 211, the transmission 230, the variable capacity pump 260, and the control valve 261 in accordance with an operation amount of each operation device (the accelerator pedal 152, the brake pedal 153, the forward and rearward movement changeover switch 156, the shift switch 157, the boom lever 158, and the bucket lever 159) provided in the cab 150.

Figure 4:
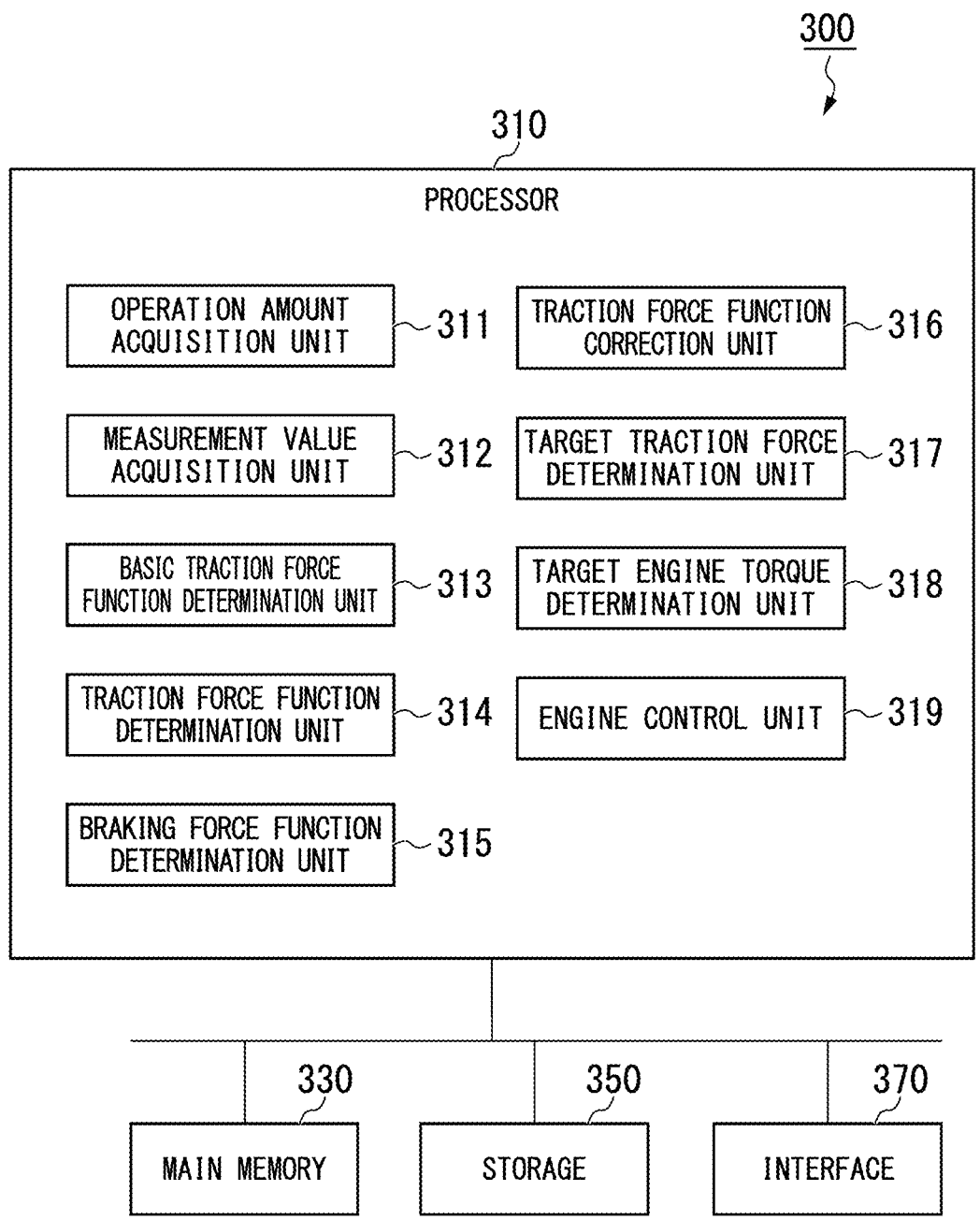
FIG. 4 is a schematic block diagram showing a configuration of a control device of the work vehicle according to the first embodiment.

FIG. 4 is a schematic block diagram showing a configuration of the control device of the work vehicle according to the first embodiment. The control device 300 is a computer including a processor 310, a main memory 330, a storage 350, and an interface 370.

The storage 350 is a non-transitory tangible storage medium. Examples of the storage 350 include a hard disk drive (HDD), a solid-state drive (SSD), a magnetic disk, a magneto-optical disk, a compact disc read-only memory (CD-ROM), a digital versatile disc read-only memory (DVD-ROM), a semiconductor memory, and the like. The storage 350 may be internal media directly connected to a bus of the control device 300 or external media connected to the control device 300 via the interface 370 or a communication line. The storage 350 stores a program for controlling the work vehicle 100.

The program may be for realizing some of the functions exhibited in the control device 300. For example, the program may exhibit its functions in combination with another program previously stored in the storage or in combination with another program mounted on another device. In another embodiment, the computer may include a custom large-scale integrated circuit (LSI) such as a programmable logic device (PLD) in addition to the above-described configuration or in place of the above-described configuration. Examples of the PLD include a programmable array logic (PAL), a generic array logic (GAL), a complex programmable logic device (CPLD), and a field-programmable gate array (FPGA). In this case, some or all of the functions which are realized by the processor may be realized by the integrated circuit.

In a case in which the program is distributed to the control device 300 via the communication line, the control device 300 having received the distributed program may deploy the program in the main memory 330 and execute the above-described process.

Further, the program may be for realizing some of the above-described functions. Further, the program may be a so-called difference file (difference program) that realizes the above-described functions in combination with another program previously stored in the storage 350.

The processor 310 executes the program to include an operation amount acquisition unit 311, a measurement value acquisition unit 312, a basic traction force function determination unit 313, a traction force function determination unit 314, a braking force function determination unit 315, a traction force function correction unit 316, a target traction force determination unit 317, a target engine torque determination unit 318, and an engine control unit 319.

The operation amount acquisition unit 311 acquires the operation amounts of the accelerator pedal 152, the brake pedal 153, the forward and rearward movement changeover switch 156, and the shift switch 157.

Hereinafter, the operation amount of the accelerator pedal 152 is also referred to as an accelerator operation amount. Further, the operation amount of the brake pedal 153 is also referred to as a brake operation amount. Further, the switching position of the forward and rearward movement changeover switch 156 is also referred to as a directional operation amount. Further, the stage number of the speed stage instructed by the shift switch 157 is also referred to as a shift operation amount.

The measurement value acquisition unit 312 acquires a measurement value of a vehicle speed from the rotational speed meter 232.

Figure 5:
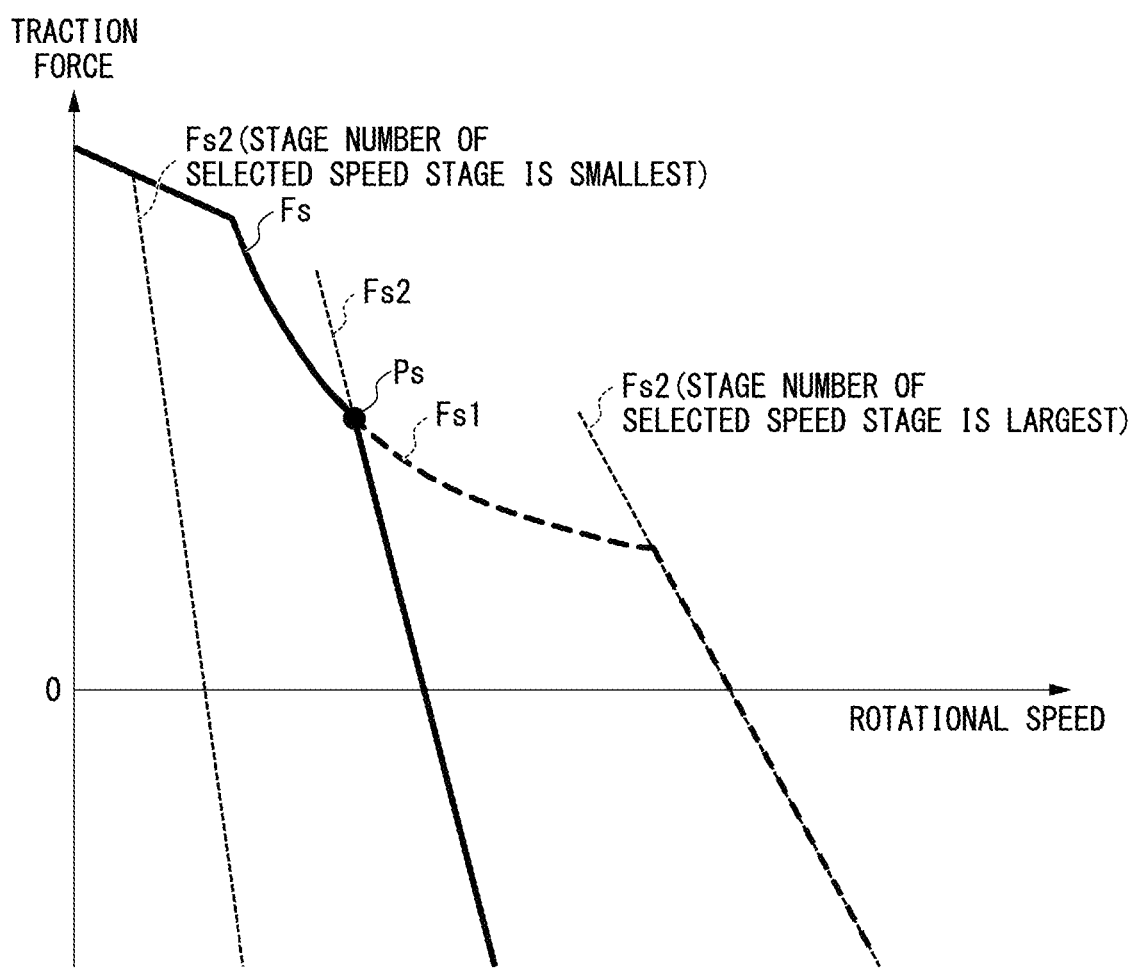
FIG. 5 is a diagram showing an example of a basic traction force function.

The basic traction force function determination unit 313 selects a speed stage based on the shift operation amount acquired by the operation amount acquisition unit 311 and determines a basic traction force function Fs indicating a relationship between the rotational speed of the output shaft of the transmission 230 and a required traction force. FIG. 5 is a diagram showing an example of the basic traction force function. The basic traction force function Fs is a function indicating a relationship between the rotational speed of the output shaft of the transmission 230 and the required traction force when the accelerator operation amount is 100%. The basic traction force function Fs is determined based on a base curve function Fs1 and an adjustment curve function Fs2. The base curve function Fs1 is a function that does not change regardless of the speed stage selection. The adjustment curve function Fs2 is a function of which an inclination changes depending on the speed stage selection. Specifically, in the adjustment curve function Fs2, the smaller the stage number of the selected speed stage (that is, the stronger the instructed traction force), the larger an absolute value of the inclination. The adjustment curve function Fs2 has a positive offset and a negative inclination. The basic traction force function determination unit 313 generates the basic traction force function Fs by combining a partial function of the base curve function Fs1, which has a rotational speed smaller than a rotational speed related to an intersection Ps between the base curve function Fs1 and the adjustment curve function Fs2 in a domain, and a partial function of the adjustment curve function Fs2, which is related to a rotational speed equal to or greater than the rotational speed related to the intersection Ps, with each other.

Figure 6:
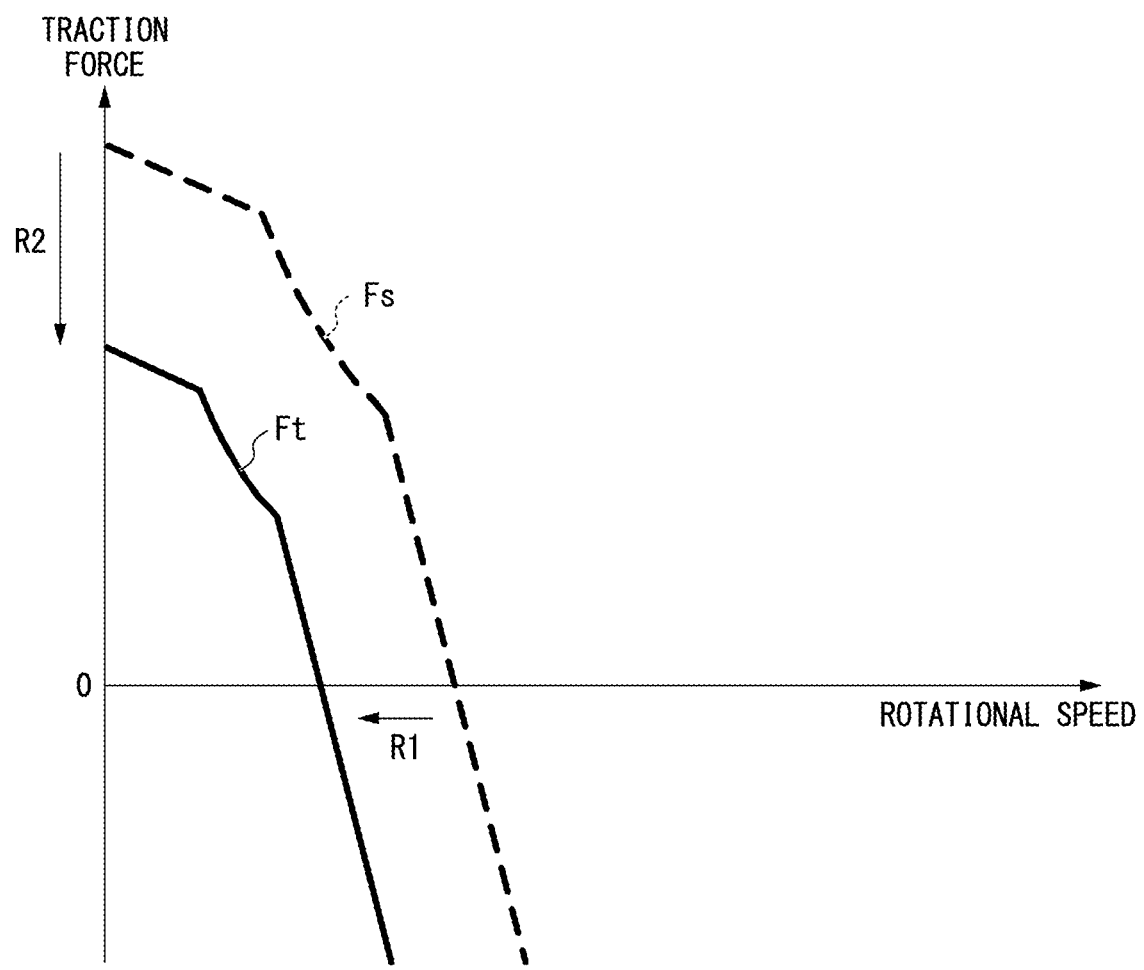
FIG. 6 is a diagram showing an example of a traction force function.

The traction force function determination unit 314 determines a traction force function Ft by reducing the basic traction force function Fs based on the accelerator operation amount acquired by the operation amount acquisition unit 311. FIG. 6 is a diagram showing an example of the traction force function. Specifically, the traction force function determination unit 314 determines the traction force function Ft by the following method. The traction force function determination unit 314 determines a reduction ratio R1 of the rotational speed and a reduction ratio R2 of the traction force based on the accelerator operation amount. In a case in which the accelerator and the brake are operated at the same time, the accelerator operation amount may be corrected in accordance with the brake operation amount, and the corrected accelerator operation amount may be used as a final accelerator operation amount. The traction force function determination unit 314 determines the traction force function Ft by multiplying the rotational speed of the basic traction force function Fs by the reduction ratio R1 and multiplying the traction force of the basic traction force function Fs by the reduction ratio R2. The reduction ratio R1 and the reduction ratio R2 are both values of 0 or more and 1 or less.

Figure 7:
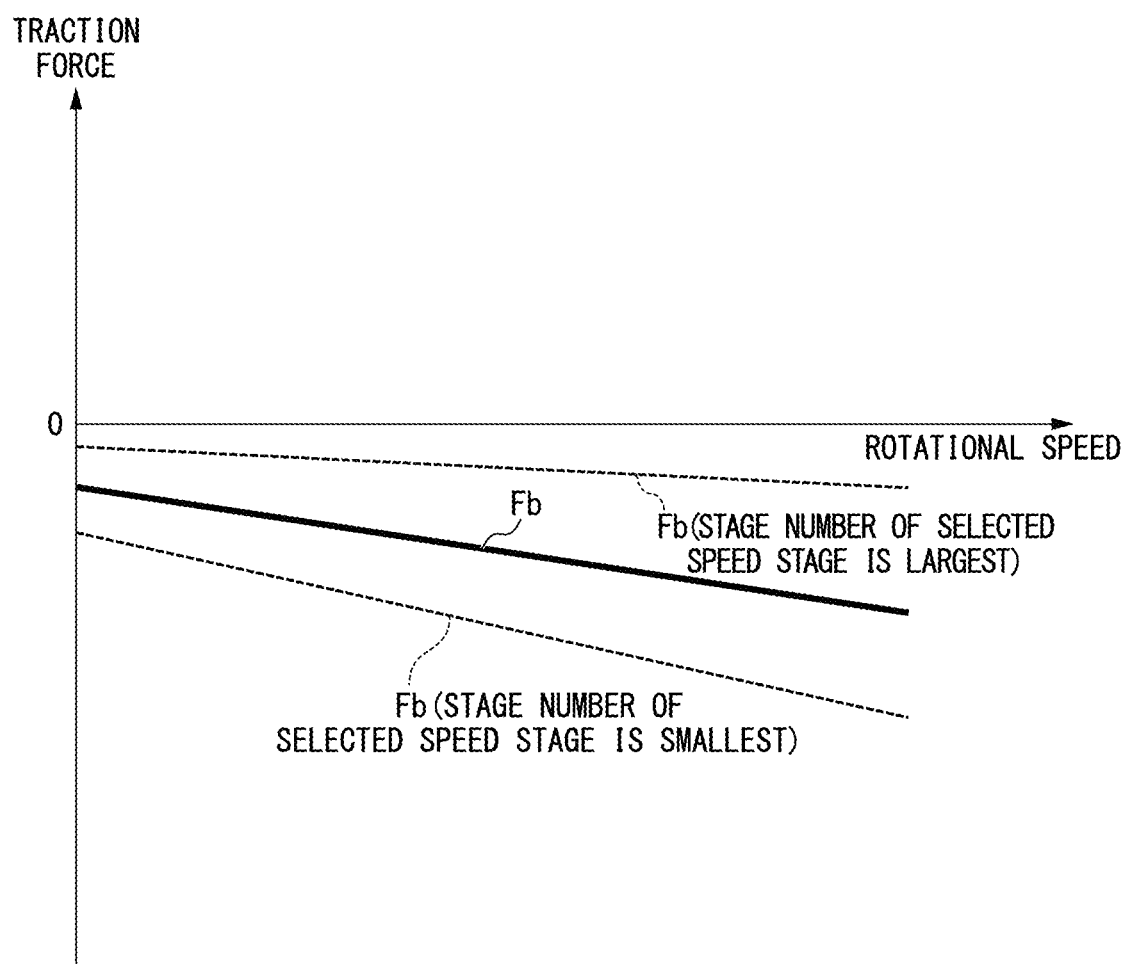
FIG. 7 is a diagram showing an example of a braking force function.

The braking force function determination unit 315 determines a braking force function Fb indicating a relationship between the rotational speed of the output shaft of the transmission 230 and a required braking force based on the speed stage determined from the shift operation amount acquired by the operation amount acquisition unit 311. FIG. 7 is a diagram showing an example of the braking force function. The braking force function Fb is a function in which an offset and an inclination change depending on the speed stage determined from the shift operation amount. Specifically, in the braking force function Fb, the smaller the speed stage determined from the shift operation amount (that is, the stronger the instructed traction force and braking force), the larger the absolute values of the offset and the inclination. The braking force function Fb has a negative offset and a negative inclination.

Figure 8:
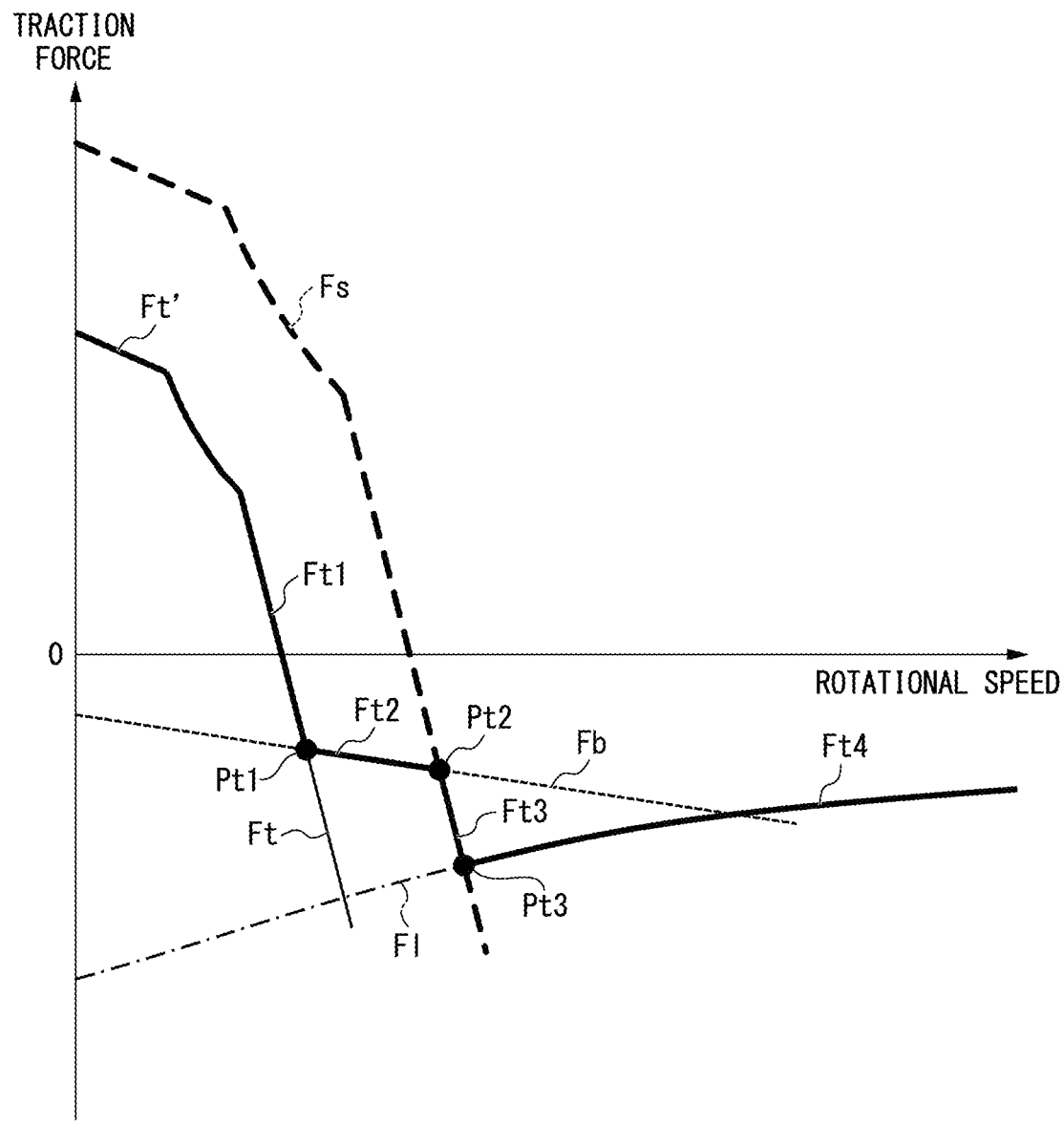
FIG. 8 is a diagram showing an example of a corrected traction force function.

The traction force function correction unit 316 generates a corrected traction force function Ft' based on the traction force function Ft, the basic traction force function Fs, and the braking force function Fb. FIG. 8 is a diagram showing an example of the corrected traction force function. Specifically, the traction force function correction unit 316 generates the corrected traction force function Ft' by combining a partial traction force function Ft1, a partial braking force function Ft2, a partial basic traction force function Ft3, and a partial limit braking force function Ft4 with each other.

The partial traction force function Ft1 is a partial function of the traction force function Ft which has a rotational speed smaller than a rotational speed related to an intersection Pt1 between the traction force function Ft and the braking force function Fb in a domain.

The partial braking force function Ft2 is a partial function of the braking force function Fb which has a rotational speed which is equal to or greater than the rotational speed related to the intersection Pt1 between the traction force function Ft and the braking force function Fb and smaller than a rotational speed related to an intersection Pt2 between the braking force function Fb and the basic traction force function Fs in a domain.

The partial basic traction force function Ft3 is a partial function of the basic traction force function Fs which has a rotational speed which is equal to or greater than the rotational speed related to the intersection Pt2 between the braking force function Fb and the basic traction force function Fs and smaller than a rotational speed related to an intersection Pt3 between the basic traction force function Fs and a limit braking force function F1 in a domain. The limit braking force function F1 is a function indicating a relationship between the rotational speed of the output shaft of the transmission 230 and the maximum braking force that can be realized by the transmission 230.

The partial limit braking force function Ft4 is a partial function which has a rotational speed equal to or greater than the rotational speed related to the intersection Pt3 between the basic traction force function Fs and the limit braking force function F1 in a domain.

The target traction force determination unit 317 determines a target traction force based on an FNR operation amount acquired by the operation amount acquisition unit 311, the rotational speed of the output shaft of the transmission 230 acquired by the measurement value acquisition unit 312, and the corrected traction force function Ft' generated by the traction force function correction unit 316. The target traction force determination unit 317 is an example of a required braking force function determination unit. The engine 210 and the transmission 230 are controlled such that the traction force in traveling generated in the work vehicle 100 follows the target traction force.

The target engine torque determination unit 318 determines a target engine torque, which is a torque to be output by the engine 210, based on an input and output speed ratio of the transmission 230 and the target traction force determined by the target traction force determination unit 317. Specifically, the target engine torque determination unit 318 determines the target engine torque by converting the target traction force into a target output shaft torque of the transmission 230 and multiplying the target output shaft torque by the input and output speed ratio of the transmission 230.

The engine control unit 319 outputs an engine torque command to the fuel injection device 211. Specifically, the engine control unit 319 outputs an engine torque command indicating the target engine torque determined by the target engine torque determination unit 318.

(Control Method of Work Vehicle)

Figure 9:
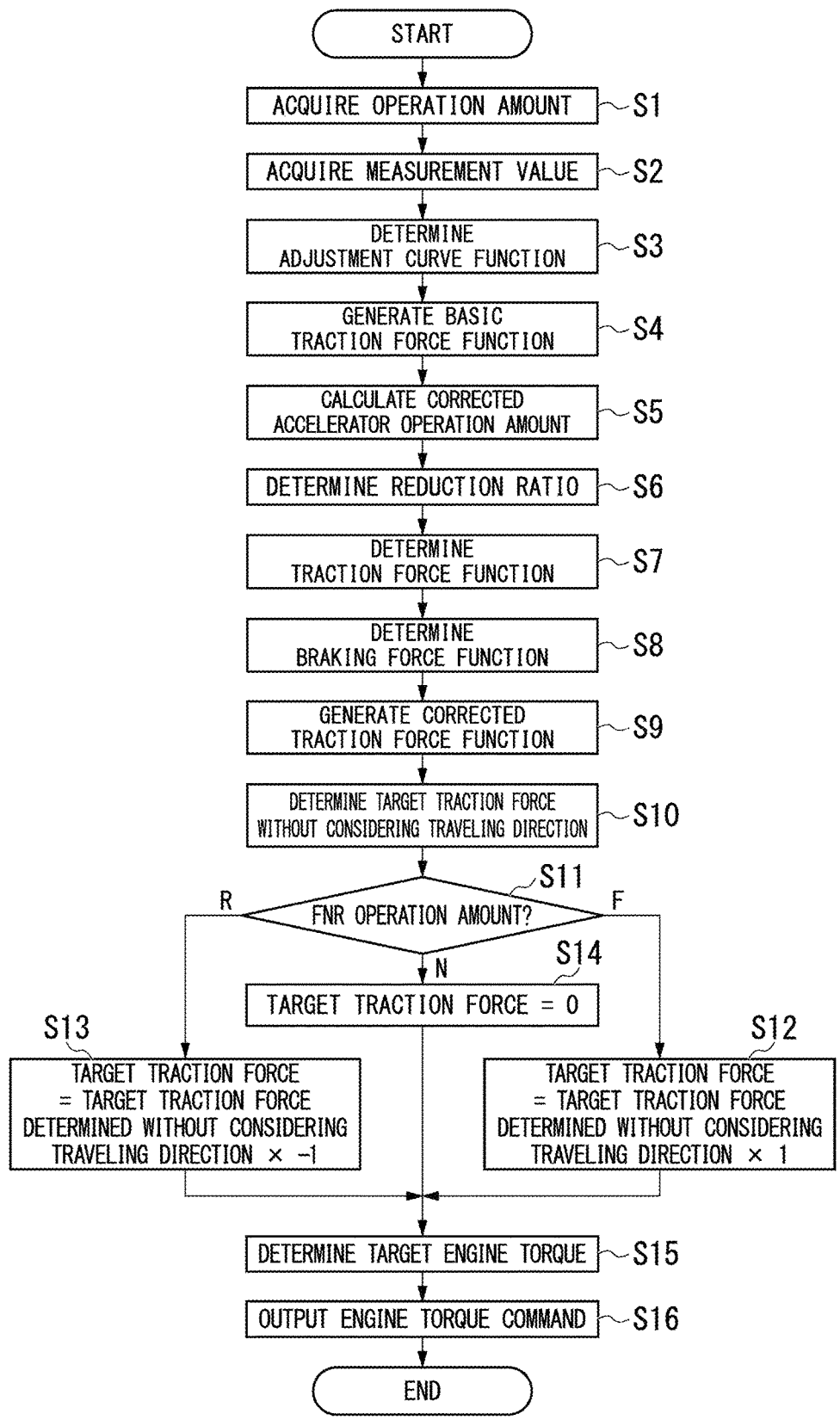
FIG. 9 is a flowchart showing a control method of the work vehicle according to the first embodiment.

FIG. 9 is a flowchart showing a control method of the work vehicle according to the first embodiment. In the following description, control when the traveling direction of the work vehicle 100 is forward (the directional operation amount is F) will be described. The same control may also be performed when the traveling direction of the work vehicle 100 is rearward (the directional operation amount is R).

First, the operation amount acquisition unit 311 acquires the operation amounts from the accelerator pedal 152, the brake pedal 153, the steering wheel 155, the forward and rearward movement changeover switch 156, and the shift switch 157 (Step S1). Further, the measurement value acquisition unit 312 acquires the measurement value of the vehicle speed from the rotational speed meter 232 (Step S2).

The basic traction force function determination unit 313 determines a speed stage from the shift operation amount acquired in Step S1 and determines the adjustment curve function Fs2 based on the determined speed stage (Step S3). The basic traction force function determination unit 313 generates the basic traction force function Fs by combining the predetermined base curve function Fs1 and the adjustment curve function Fs2 with each other (Step S4).

Next, the traction force function determination unit 314 calculates the corrected accelerator operation amount from the accelerator operation amount and the brake operation amount acquired in Step S1 (Step S5). The traction force function determination unit 314 sets the corrected accelerator operation amount to "0" when the accelerator operation amount is smaller than the brake operation amount. The traction force function determination unit 314 determines the reduction ratio R1 of the rotational speed and the reduction ratio R2 of the traction force based on the corrected accelerator operation amount (Step S6). The traction force function determination unit 314 determines the traction force function Ft by multiplying the rotational speed of the basic traction force function Fs by the reduction ratio R1 and multiplying the traction force of the basic traction force function Fs by the reduction ratio R2 (Step S7).

The braking force function determination unit 315 determines the speed stage from the shift operation amount acquired in Step S1 and determines the braking force function Fb indicating the relationship between the rotational speed of the output shaft of the transmission 230 and the required braking force based on the determined speed stage (Step S8).

The traction force function correction unit 316 generates the corrected traction force function Ft', based on the basic traction force function Fs determined in Step S4, the traction force function Ft determined in Step S7, and the braking force function Fb determined in Step S8, by combining the basic traction force function Fs, the traction force function Ft, the braking force function Fb, and the predetermined limit braking force function F1 with each other (Step S9).

The target traction force determination unit 317 determines a target traction force without considering the traveling direction by substituting the rotational speed of the output shaft of the transmission 230 acquired in Step S2 into the corrected traction force function Ft' generated by the traction force function correction unit 316 (Step S10). The target traction force determination unit 317 determines which of forward, reward, and neutral the FNR operation amount acquired in Step S1 indicates (Step S11).

When the FNR operation amount indicates forward (Step S11: F), the target traction force determination unit 317 determines a target traction force to be the target traction force without considering the traveling direction determined in Step S10 (Step S12).

When the FNR operation amount indicates rearward (Step S11: R), the target traction force determination unit 317 determines a target traction force to be a value obtained by multiplying the target traction force without considering the traveling direction determined in Step S10 by "−1" (Step S13).

When the FNR operation amount indicates neutral (Step S11: N), the target traction force determination unit 317 determines a target traction force to be "0" (Step S14).

The target engine torque determination unit 318 determines a target engine torque, which is a torque to be output by the engine 210, based on the required output torque determined in Step S12, S13, or S14 (Step S15). The engine control unit 319 outputs an engine torque command indicating the target engine torque determined in Step S15 (Step S16).

<<Operations and Effects>>

As described above, according to the first embodiment, the control device 300 determines the offset and the inclination for the required braking force in the braking force function Fb such that the stronger the traction force which is instructed with the speed stage determined from the shift operation amount, the larger the absolute values of the offset and the inclination, and determines the required braking force based on the rotational speed of the output shaft of the transmission 230 and the braking force function Fb. That is, the control device 300 can adjust the braking force depending on the shift operation amount. As a result, the operator can easily obtain an arbitrary braking force. In the first embodiment, the shift switch 157 is operated to determine the speed stage and instruct the traction force, but other embodiments are not limited to this. For example, in another embodiment, the braking force function Fb may be determined based on an operation amount of the brake pedal 153 or an inching pedal (not shown) instead of the shift switch 157. The brake pedal 153 and the inching pedal in this case are examples of the traction force instruction device. Further, the control device 300 according to the first embodiment determines the offset and the inclination for the required braking force in the braking force function Fb such that the stronger the traction force which is instructed with the speed stage determined from the shift operation amount, the larger the absolute values of the offset and the inclination, but in another embodiment, the control device 300 may determine any one of the offset and the inclination for the required braking force in the braking force function Fb.

Further, according to the first embodiment, the control device 300 generates the corrected traction force function Ft' based on the traction force function Ft, the basic traction force function Fs, and the braking force function Fb and determines the required braking force based on the rotational speed of the output shaft and the corrected traction force function Ft'. As a result, the control device 300 can realize two-step deceleration with the intersection between the basic traction force function Fs and the braking force function Fb as a boundary. In the first embodiment, the basic traction force function Fs changes depending on the speed stage determined from the shift operation amount, but other embodiments are not limited to this. For example, the control device 300 according to another embodiment may use the base curve function as the basic traction force function Fs.

The embodiment has been described in detail above with reference to the drawings, but a specific configuration is not limited to the above-described configuration, and various design changes and the like can be made. For example, in another embodiment, the order of the above-described steps may be changed as appropriate. In addition, some steps may be executed in parallel.

Although the work vehicle 100 according to the above-described embodiment is a wheel loader, the present invention is not limited to this. For example, the work vehicle 100 according to another embodiment may be another work vehicle such as a dump truck, a motor grader, or a bulldozer.

The control device 300 according to the above-described embodiment determines the basic traction force function based on the base curve function and the adjustment curve function, but the present invention is not limited to this. For example, in another embodiment, the basic traction force function may be associated in advance with each speed stage determined from the shift operation amount.

The control device 300 according to the above-described embodiment determines the basic traction force function based on the same base curve function and adjustment curve function regardless of the traveling direction, but the present invention is not limited to this. For example, in another embodiment, different basic traction force functions may be used for forward and rearward. In this case, the basic traction force function Fs corresponding to the traveling direction is generated in Steps S3 and S4. Further, S12 and S13 are omitted.

According to the above disclosure of the present invention, an operator can easily obtain an arbitrary braking force.

The invention claimed is:

1. A control device of a work vehicle including a drive source, a traveling device driven by a driving force of the drive source, a power transmission device having an input shaft connected to the drive source and an output shaft connected to the traveling device and transmitting the driving force input to the input shaft to the output shaft, and a traction force instruction device configured to receive a traction force instruction of instructing a strength of a traction force of the traveling device, the control device comprising:
a processor; and
a storage storing a program, the processor executing the program to realize the following:

determining at least one of an offset and an inclination of a braking force function that defines a relationship between a rotational speed of the output shaft and a required braking force in which the rotational speed is indicated on a horizontal axis and the traction force is indicated on a vertical axis, the offset being an intercept of the braking force function with respect to a negative portion of the vertical axis, the braking force function being determined such that the stronger the traction force indicated by the traction force instruction from the traction force instruction device is, the larger an absolute value of at least one of the offset and the inclination is determined to be and such that an absolute value of the required braking force monotonically increases with respect to the rotational speed;

determining the required braking force based on the rotational speed of the output shaft and the braking force function; and controlling the drive source based on the required braking force.

2. The control device of a work vehicle according to claim 1, wherein the work vehicle further includes a driving force operating device configured to receive a driving force instruction of instructing a strength of the driving force of the drive source, and the control device executing the program to further realize:

determining a traction force function by multiplying a basic traction force function, which indicates a relationship between the rotational speed of the output shaft and a required traction force and indicates a braking force as a negative value of the required traction force, by a coefficient of 1 or less in accordance with the driving force instruction from the driving force operating device; and determining a corrected traction force function, which indicates the relationship between the rotational speed of the output shaft and the required traction force and the required braking force, such that the corrected traction force function includes a portion of the traction force function in a first region of rotational speeds smaller than a first rotational speed corresponding to a first intersection between the traction force function and the braking force function and a portion of the braking force function in a second region of rotational speeds greater than the first rotational speed, the processor determining the required braking force based on the rotational speed of the output shaft and the corrected traction force function.

3. The control device of a work vehicle according to claim 2, wherein the coefficient is set based on an operation amount of an accelerator of the work vehicle.

4. The control device of a work vehicle according to claim 3, wherein the traction force instruction includes a speed stage set by a shift switch, and the brake force function is determined such that the absolute value of the at least one of the offset and the inclination becomes larger as the speed stage becomes smaller.

5. The control device of a work vehicle according to claim 2, wherein the traction force instruction includes a speed stage set by a shift switch, and the brake force function is determined such that the absolute value of the at least one of the offset and the inclination becomes larger as the speed stage becomes smaller.

6. A work vehicle including the control device according to claim 1, the work vehicle further comprising:

the drive source;

the traveling device driven by the driving force of the drive source;

the power transmission device having the input shaft connected to the drive source and the output shaft connected to the traveling device and transmitting the driving force input to the input shaft to the output shaft; and the traction force instruction device configured to instruct the strength of the traction force of the traveling device.

7. A control device of a work vehicle including a drive source, a traveling device driven by a driving force of the drive source, a power transmission device having an input shaft connected to the drive source and an output shaft connected to the traveling device and transmitting the driving force input to the input shaft to the output shaft, a traction force instruction device configured to receive a traction force instruction of instructing a strength of a traction force of the traveling device, and a driving force operating device configured to receive a driving force instruction of instructing a strength of the driving force of the drive source, the control device comprising:

a processor; and a storage storing a program, the processor executing the program to realize the following:

determining at least one of an offset and an inclination of a braking force function for determining a required braking force such that the stronger the traction force indicated by the traction force instruction from the traction force instruction device is, the larger an absolute value of at least one of the offset and the inclination is determined to be, the braking force function indicating a relationship between a rotational speed of the output shaft and the required braking force and in which the required braking force monotonically increases with respect to the rotational speed;

determining the required braking force based on the rotational speed of the output shaft and the braking force function;

determining a traction force function by multiplying a basic traction force function, which indicates a relationship between the rotational speed of the output shaft and a required traction force and indicates a braking force as a negative value of the required traction force, by a coefficient of 1 or less in accordance with the driving force instruction from the driving force operating device;

determining a corrected traction force function, which indicates the relationship between the rotational speed of the output shaft and the required traction force and the required braking force, such that the corrected traction force function includes a portion of the traction force function in a first region of rotational speeds smaller than a first rotational speed corresponding to a first intersection between the traction force function and the braking force function and a portion of the braking force function in a second region of rotational speeds greater than the first rotational speed; and controlling the drive source based on the required braking force, the processor further defining the corrected traction force function to include a portion of the basic traction force function in a third region of rotational speeds larger than a second rotational speed that is larger than the first rotational speed, the second rotational speed corresponding to a second intersection between the basic traction force function and the braking force function.

8. A control method of a work vehicle including a drive source, a traveling device driven by a driving force of the drive source, a power transmission device having an input shaft connected to the drive source and an output shaft connected to the traveling device and transmitting the driving force input to the input shaft to the output shaft, and a traction force instruction device configured to receive a traction force instruction of instructing a strength of a traction force of the traveling device, the control method comprising using a processor executing a program to realize the following:

determining at least one of an offset and an inclination of a braking force function that defines a relationship between a rotational speed of the output shaft and a required braking force in which the rotational speed is indicated on a horizontal axis and the traction force is indicated on a vertical axis, the offset being an intercept of the braking force function with respect to a negative portion of the vertical axis, the braking force function being determined such that the stronger the traction force indicated by the traction force instruction from the traction force instruction device is, the larger an absolute value of at least one of the offset and the inclination is determined to be and such that an absolute value of the required braking force monotonically increases with respect to the rotational speed;

determining the required braking force based on the rotational speed of the output shaft and the braking force function; and controlling the drive source based on the required braking force.

* * * * *